Feb. 28, 1939.   G. LORY   2,148,908
MECHANICAL STAGE
Filed March 24, 1937
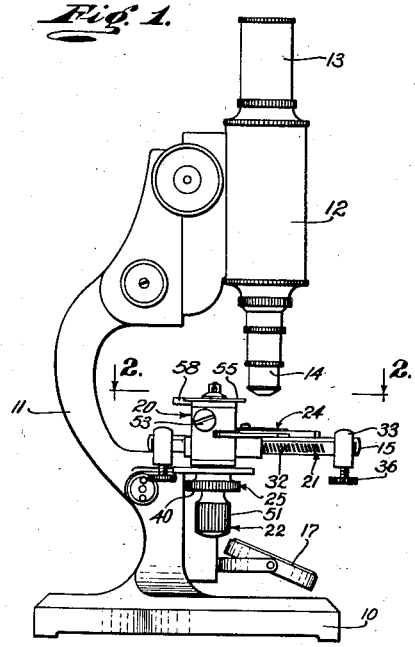
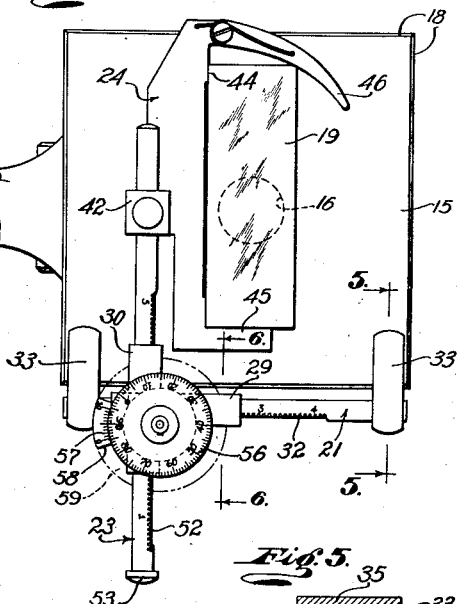
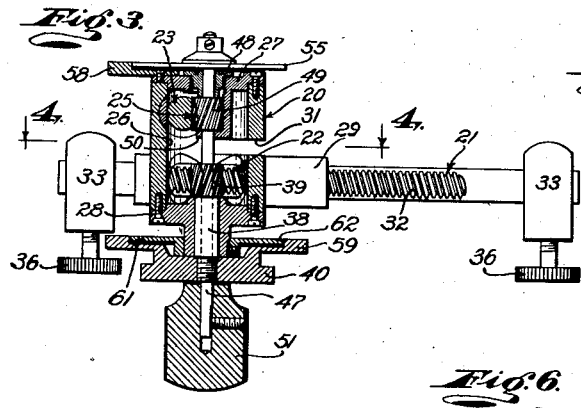
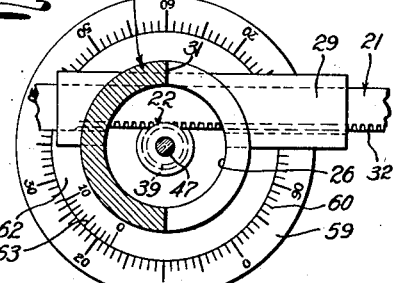
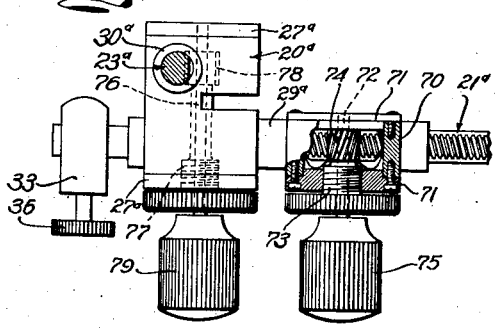
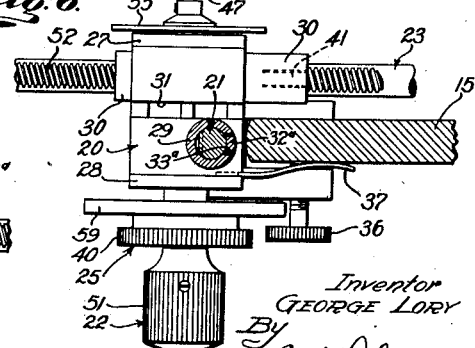
Inventor
GEORGE LORY
By
His Attorney Patented Feb. 28, 1939

2,148,908

UNITED STATES PATENT OFFICE 2,148,908

MECHANICAL STAGE

George Lory, Los Angeles, Calif.

Application March 24, 1937, Serial No. 132,787

6 Claims. (Cl. 88—40)

This invention relates to attachments or appliances for microscopes, and relates more particularly to mechanical stages for microscopes. A general object of this invention is to provide a microscope mechanical stage that is particularly easy and convenient to use and that is very simple and inexpensive to manufacture.

The mechanical stages for microscopes usually embody rack and pinion adjustments for shifting the slide in two directions at right angles to one another. It has been the general practice to provide the rack and pinion adjustments with turnable buttons or knobs projecting upwardly and located above the stage of the microscope so that the operator or user must bring his hand above the stage to manipulate these knobs. This is sometimes inconvenient and the operator's hand sometimes strikes the slide, the nose-piece, and other parts of the instrument in carrying out the adjustments. Further, where the adjusting knobs are located above the stage there is no rest against which the user may engage his hand when making a fine or accurate adjustment.

Another object of this invention is to provide a mechanical stage for a microscope in which the adjusting knobs are below the stage to be conveniently accessible for manipulation.

Another object of this invention is to provide a mechanical stage of the character mentioned in which the adjusting knobs are in close proximity to one another and are located so that the operator may rest his hand on the table or support carrying the microscope and conveniently adjust both knobs without shifting his hand and while resting his hand on the table or support, to obtain a fine and delicate adjustment.

Another object of this invention is to provide a mechanical stage embodying means for holding the slide downwardly against the stage to eliminate the possibility of upward displacement of the slide during adjustment.

Another object of this invention is to provide a mechanical stage of the character mentioned in which dials are provided concentric with the axis of the adjusting pinions and the adjusting knobs to indicate the exact position of the slide, which dials may be read while the operator is in the usual position at the microscope. The mechanical stages heretofore introduced had calibrations extending along the racks which were difficult to read and necessitated changing position in order to read them.

Another object of this invention is to provide a mechanical stage that embodies a minimum number of parts and does not develop looseness or play between its parts to effect the setting of the slide or the reading of the slide adjustments.

The various objects and features of my invention will be fully understood from the following detailed description of typical preferred forms and applications of the invention, throughout which description reference is made to the accompanying drawing, in which:

Fig. 1 is a side view of a typical microscope illustrating one form of the mechanical stage of the invention arranged on its stage. Fig. 2 is an enlarged plan elevation of the stage and the mechanical stage, being a view taken as indicated by line 2—2 on Fig. 1. Fig. 3 is an enlarged vertical detailed sectional view through the center of the body of the mechanical stage illustrated in Figs. 1 and 2. Fig. 4 is an enlarged horizontal detailed sectional view taken substantially as indicated by line 4—4 on Fig. 3. Fig. 5 is an enlarged fragmentary vertical detailed sectional view taken as indicated by line 5—5 on Fig. 2 illustrating one of the clamps for securing the mechanical stage to the stage. Fig. 6 is a fragmentary vertical detailed sectional view taken as indicated by line 6—6 on Fig. 2 and Fig. 7 is a side elevation of another form of mechanical stage of the invention with certain parts broken away to appear in vertical cross section.

In the following detailed description I will describe two forms of the invention as applied to or used on a typical microscope having a rectangular stage. It is to be understood that the mechanical stages of the invention may be employed on various types and forms of microscopes and that the invention is not to be construed as limited or restricted to the specific forms or application about to be described.

The typical microscope illustrated in the drawing includes, generally, a base 10 having an upwardly projecting pedestal or arm 11. The usual tube 12 is pivoted on the arm 11 and carries an eye-piece 13 and the objective lens or objective 14. The stage 15 projects outwardly from the arm 11 below the objective 14 and presents a flat upper surface. An opening 16 is provided in the stage 15 directly below the objective 14 and the usual mirror 17 is arranged below the stage 15 in alignment with the opening 16 and the objective 14. The particular stage 15 illustrated has straight edges 18 extending at right angles to one another. A typical glass slide 19 is shown arranged on the stage 15 and extending across the opening 16.

The mechanical stage of the present invention illustrated in Figs. 1 to 6, inclusive, of the drawing includes, generally, a body 20, a rack 21 extending through the body 20 and adapted to be secured to the stage 15, means 22 for operating or shifting the body 20 along the rack 21, a second rack 23 extending through the body 20, a slide holder 24 on the rack 23 for the slide 19 and means 25 for operating the rack 23.

The body 20 may be a simple tubular member arranged in a vertical position at one edge or side 18 of the stage 15. The body 20 has a central longitudinal opening 26 which is closed at its upper end by a plate 27 and which is closed at its lower end by a similar plate 28. The plates 27 and 28 may be secured to the body 20 by suitable screws. A pair of aligned tubular bearing projections 29 project horizontally from the body 20. The projections 29 project substantially parallel with the adjacent edge 18 of the stage 15 and are tangential with respect to a circle concentric with the longitudinal axis of the body 20. In practice the tubular bearing projections 29 may be provided by securing a tube in a suitable tangential opening in the wall of the body 20. The opening 26 of the body 20 joins or partially intersects the opening of the tubular projections 29. A pair of similar longitudinally aligned tubular bearing projections 30 are provided on the body 20 above the projections 29. The longitudinal axis of the aligned projections 30 is at right angles to the axis of the projections 29 and is tangential with respect to the longitudinal axis of the body 20. The opening extending through the projections 30 is partially intersected or joined by the body opening 26. A substantially horizontal or transverse slot 31 is provided in the wall of the body 20 at a point between the sets or pairs of projections 29 and 30. The slot 31 is of sufficient width and depth to receive the slide holder 24 and the slide 19 when the holder 24 is shifted to project over the adjacent edge 18 of the stage 15.

The rack 21 extends through the bearing projections 29 to adjustably support the body 20 and the parts carried thereby. In accordance with the invention the rack 21 may be a simple integral member, as illustrated. While I have shown the rack as being round or cylindrical in cross section it is to be understood that the rack may have any desired or suitable shape. The rack 21 passes completely through the aligned projections 29 and is of substantial length. In practice the rack 21 may be of substantially the same length as the adjacent edge 18 of the stage 15. The rack 21 is provided with a longitudinal series of teeth 32. It is a feature of the invention that the rack teeth 32 may be cut or formed directly in the rack 21. A side or surface of the rack 21 may be flattened and the teeth 32 may project from this flat side of the rack. In the particular construction illustrated the rack teeth 32 are pitched or partially helical. The rack teeth 32 face outwardly, that is, toward the vertical axis of the body 20 and away from the stage 15.

Means is provided for maintaining a suitable frictional contact between the rack 21 and the body 20 to prevent undesirable or unintentional movement of the body 20 along the rack 21. Two spaced longitudinal slots or cuts 33ª extend into one of the projections 29 from its outer end. The metal tongue 32ª between the two spaced cuts 33ª is bent or distorted inwardly to yieldingly and frictionally bear on the surface of the rack 21. The tongue 32ª bearing against the rack 21 yieldingly resists movement of the body 20 along the rack preventing undesirable shifting of the body and preventing the development of play between the body and the rack. The body 20 is supported on the rack 21 for limited rocking or pivotal movement about the axis of the rack, this movement being limited by the engagement of a pinion with the teeth 32, as will be subsequently described.

The invention provides novel and particularly effective means for securing the rack 21 to the stage 15 and for yieldingly pivoting the body 20 toward the stage to maintain the holder 24 and the slide 19 against the upper surface of the stage. A substantially U-shaped clamp 33 is provided on each end portion of the rack 21. The clamps 33 may be secured to the rack 21 by set screws 34. The edge portion of the stage 15 is received between the spaced arms 35 of the clamps 33. Thumb screws 36 are threaded through openings in the lower arms 35 and engage against the lower surface of the stage 15 to secure the rack 21 to the stage. The bodies of the clamps 33 may be arranged against the edge 18 of the stage 15, as illustrated in Fig. 5, to definitely locate the mechanical stage relative to the said edge 18 and the ends of the rack 21 may be aligned with the inner and outer edges 18 of the stage 15 to position the mechanical stage in the other direction. In accordance with the invention one or more leaf springs 37 are secured to the body 20 and project from the body to yieldingly bear upwardly against the lower surface of the stage 15. The springs 37 may be secured to the lower end of the body 20. The springs 37 are curved or bent to effectively exert an upward force against the stage 15. The springs 37 are located below the longitudinal axis of the rack 21 and, therefore, tend to turn or pivot the body 20 on the rack 21 to urge the holder 24 and the slide 19 downwardly against the upper surface of the stage 15.

The means 22 for shifting the body 20 along the rack 21 includes a bushing or a tubular stub shaft 38 rotatable in an opening in the lower plate 28 of the body 20. The plate 28 may be thickened or provided with an outwardly projecting boss-like part to provide a long bearing for the stub shaft 38. The stub shaft 38 projects downwardly beyond the lower end of the thickened plate 28. A pinion 39 is fixed to the inner end of the stub shaft 38 and meshes with the teeth 32 of the rack 21. The shaft 38 is, of course, co-axial with the body 20 and the pinion 39 meshes with the teeth 32 within the body. A knob 40 is threaded or otherwise fixed on the projecting lower end portion of the stub shaft 38. The knob 40 may be knurled for convenient manipulation. The lower side or end of the pinion 39 cooperates with the inner side of the plate 28 to limit downward movement of the stub shaft 38 while the knob 40 cooperates with the lower side of the plate 28 to limit upward movement of the stub shaft. By turning the knob 40 the stub shaft 38 and the pinion 39 are rotated and the cooperation of the pinion 39 with the teeth 32 advances the body 20 along the rack 21. The direction of movement of the body 20 along the rack 21, of course, depends upon the direction of turning of the knob 40. The projections 29 of the body 20 may cooperate with the clamps 33 to limit the movement of the body along the rack 21.

The rack 23 carries the slide holder 24 and is shiftable relative to the body 20 in a direction at right angles to the longitudinal axis of the rack 21 to move the holder 24 and the slide 19 toward and away from the body 20. The rack 23 may be of the same shape and construction as the rack 21. Thus in the form of the invention illustrated the rack 23 is a simple, integral bar that is generally cylindrical in shape. It is to be understood that the rack 23 may be of other shapes, if desired. A series of teeth 52 is formed or cut directly in the integral rack 23. The rack 23 is shiftable longitudinally through the bearing projections 30 to pass tangentially through the body 20. One bearing projection 30 may have a flexible tongue 41 similar to the tongue 32ª. The tongue 41 yieldingly bears against the rack 23 to resist movement of the rack relative to the body 20 and thus prevent undesirable play and unintentional movement of the rack and the slide holder 24. The rack 23 projects from the body 20 to extend across or over the upper surface of the stage 15. In the preferred construction the rack 23 passes over the stage 15 with substantial clearance. The portion of the rack 23 projecting over the stage 15 carries the slide holder 24.

The holder 24 may be of typical or conventional design. In the case illustrated the holder 24 is a flat plate-like member secured to the rack 23 by a suitable clamp 42. The holder 24 is relatively thin and lies flat against the upper surface of the stage 15, being held against the stage 15 by the spring 37, as described above. The holder 24 is elongate and has its longitudinal axis parallel with the longitudinal axis of the rack 23. The slide holder 24 has a longitudinal edge 44 facing the opening 16 and a rigid or integral finger 45 at one end of the edge 44 against which an end of the slide 19 may be arranged when one of its longitudinal edges is against the edge 44. A pivoted spring urged finger 46 is provided on the other end of the holder 24 to hold the slide 19 against the finger 45 and the edge 44. It is to be understood that the holder 24 is secured to the rack 23 by the clamp 42 so that the holder and the slide 19 move with the rack.

The means 25 for operating the rack 23 includes a shaft 47 extending through the tubular stub shaft 38 and passing longitudinally through the body 20. The shaft 47 extends downwardly beyond the lower end of the stub shaft 38 and has its upper portion rotatably supported by a bushing 48 in the upper body plate 27. The stub shaft 38 serves to rotatably support the lower portion of the shaft 47. A pinion 49 is fixed to the shaft 47 and meshes with the teeth 52 of the rack 23. A partially tubular bearing 50 on the plate 27 may aid in rotatably supporting the shaft 47 and may engage the lower end of the pinion 49 to limit endwise movement of the shaft in one direction. The upper end of the pinion 49 may engage the bushing 48 to limit endwise movement of the shaft 47 in the other direction. A suitable knob 51 is fixed to the projecting lower portion of the shaft 47. The knob 51 may be turned to rotate the pinion 49 which in turn cooperates with the rack teeth 52 to move the rack 23. A head 53 may be provided on the outer end of the rack 23 to cooperate with the outer bearing projection 30 to limit movement of the rack 23 in the other direction. The knob 51 for turning the shaft 47 is preferably located adjacent or immediately below the knob 40.

It is to be noted that the two operating knobs 40 and 51 are co-axial and adjacent one another so that both knobs may be conveniently manipulated without changing the position of the hand engaging them. Further, it is to be noted that the knobs 40 and 51 are below the body 20 and the stage 15 to be readily manipulated by the operator's hand resting on the table or support carrying the microscope. The location of the body 20 beyond the adjacent edge 18 of the stage 15 allows the body and the knobs 40 and 41 to project below the stage without interfering with the stage. The racks 21 and 23 are of sufficient length to provide for full adjustment of the slide 19 whereby the slide may be shifted or adjusted to have any part of its surface aligned with the optical axis of the microscope. The slot 31 readily receives the holder 24 and slide 19 when they are brought to positions where they project over the rack 21.

It is a feature of the invention that scales or calibrations are provided in connection with the means for operating the body 20 and the rack 23 whereby the position of the slide 19 relative to the optical axis of the microscope may be accurately determined. A disc-like dial 55 is fixed to the projecting upper end of the shaft 47 to overlie the upper end of the body 20. The dial 55 has circumferentially spaced calibrations 56 on its upper surface adjacent its periphery. The calibrations 56 are equally spaced and suitable numerals may be provided for the calibrations 56 at regular intervals. The calibrations 56 and their numerals may, of course, indicate any selected scale of movement of the slide 19 in a direction transverse of the movement of the body 20. For example, the calibrations 56 may indicate movement of the slide 19 in millimeters and fractions of millimeters. The calibrations 56 are adapted to be read in connection with a fixed scale. A fixed or relatively stationary scale 57 is provided on the upper surface of an arm 58 projecting from the plate 27. The scale 57 may be a vernier scale whereby the calibrations 56 may be read in connection with the calibrations of the scale 57 to give fractional readings with great precision.

A scale means is also associated with the means 22 for moving the body 20 and the slide 19 in a direction parallel with the axis of the rack 21. An annular dial 59 is provided on the upper end of the knob 40. The upper surface of the dial 59 is provided with an annular series of calibrations 60 similar to the calibrations 56. The calibrations 60 are adjacent the periphery of the dial 59 to be visible around the periphery of the body. The calibrations 60 may have suitable numerals at regular intervals. A recess 61 is provided in the upper side of the dial 59 and a stationary or relatively stationary disc 62 is received in the recess 61. The disc 62 is fixed to the thickened body plate 29 to remain stationary relative to the body 20. A vernier scale 63 is provided on the upper surface of the disc 62 to facilitate the reading of the calibrations 60. The calibrations 60 may be read in connection with the vernier scale 63 to accurately determine the setting of the slide 19 when adjusted in a direction parallel with the longitudinal axis of the rack 21. It will be noted that all of the scales described above face upwardly and are co-axial to be easily and conveniently read. If desired the upper surfaces of the racks 21 and 23 may carry calibrations or numerals or both to facilitate the setting or adjustment of the slide 19. It will be apparent that the calibrated indicating means described above may be varied considerably in character and construction without departing from the invention.

It is believed that the operation of the mechanical stage described above will be readily understood. The mechanical stage may be easily applied to the microscope by means of the clamps 33. By arranging the clamps 33 against the adjacent edge 18 of the stage 15 and by aligning an end of the rack 21 with an end of the stage the mechanical stage may be definitely positioned with relation to the stage 15. The springs 37 constantly urge the holder 24 and the slide 19 downwardly against the upper surface of the stage 15 and prevent them from shifting or becoming displaced vertically.

In the use of the mechanical stage the knobs 40 and 51 may be turned to shift and locate the slide 19 as desired. The knobs 40 and 51, of course may be individually turned to bodily shift the body 20 along the rack 21 and to shift the rack 23 relative to the body and in a direction at right angles to the movement of the body. In this manner the slide 19 may be shifted to any desired position. The scale 56 may be read in connection with the scale 57 and the scale 60 may be read in connection with the scale 63 to accurately locate the slide 19 or to properly determine the position of the object on the slide that is within the range of the field of the microscope. The knobs 40 and 51 are located below the body 20 and the stage 15 so that they may be conveniently manipulated without moving the hand over the stage and without raising the hand from the table or support carrying the microscope. The operator may steady and rest his hand on the table and adjust both knobs 40 and 51 without shifting his hand. In this manner a very fine or delicate setting may be obtained. The racks 21 and 23 are integral and are frictionally engaged by the tongues 32 and 41, respectively, so that little or no play will develop even after extended use of the device. The device or attachment is extremely simple and is easy to manufacture and assemble. The mechanical stage may be readily attached or applied to the stages of microscopes of various makes and designs.

Fig. 7 of the drawing illustrates a slightly modified form of the invention in which the knobs for operating or shifting the slide holder 24 are in spaced side by side relation. The body 20ª of the device illustrated in Fig. 7 may be identical with the body 20 except that its inner bearing projection 29ª has a tubular vertical boss 70. Plates 71 close the upper and lower ends of the tubular boss 70. The racks 21ª and 23ª may be identical with the above described racks 21 and 23. The means for shifting the body 20ª along the rack 21ª may comprise a shaft 72 extending through the boss 70. The upper portion of the shaft 72 may be rotatably supported in the upper plate 71. A tubular nut 73 may be threaded in the lower plate 71 to rotatably carry the lower portion of the shaft 72. A pinion 74 is fixed on the shaft 72 to mesh with the teeth of the rack 21ª. The shaft 72 projects downwardly beyond the nut 73 and a knurled knob 75 is fixed to its projecting lower portion. The knob 75 may be turned to move the body 20ª along the rack 21ª and thus move the slide holder 24 in a direction parallel with the longitudinal axis of the rack 21ª. It is to be understood that the rack 21ª may be secured to the stage 15 by the clamps 33.

The rack 23ª slidably passes through the bearing projections 30ª of the body 20ª. The means for shifting the rack 23ª comprises a shaft 76 extending longitudinally through the body 20ª. Plates 27ª are provided on the upper and lower ends of the body 20ª and the upper portion of the shaft 76 may be rotatably supported by the upper plate 27ª. A nut or tubular bearing 77 is threaded in an opening in the lower plate 27ª and rotatably carries the major lower portion of the shaft 76. A pinion 78 is fixed to the shaft 76 to mesh with the teeth of the rack 23ª. The pinion 78 is located between the upper plate 27ª and the upper end of the bearing 77. A suitable knurled knob 79 is fixed to the projecting lower portion of the shaft 76. The knob 79 may be manipulated or turned to rotate the pinion 78 and thus shift the rack 23ª and the slide holder 24 in a direction at right angles to the axis of the rack 21ª.

It will be observed that the shafts 72 and 76 are in spaced parallel relation and that the knobs 75 and 79 are spaced apart horizontally and are located in substantially the same horizontal plane. The two knobs 75 and 79 are below the plane of the stage 15 and project downwardly to be conveniently manipulated by the operator's hand which may rest on the table or support carrying the microscope. The operation of the mechanical stage illustrated in Fig. 7 is substantially the same as the operation of the previously described form of the invention. If desired the mechanical stage illustrated in Fig. 7 may be inverted with respect to the position illustrated to have the knobs 75 and 79 located above the plane of the stage 15.

Having described only typical preferred forms and applications of my invention, I do not wish to be limited or restricted to the specific details herein set forth, but wish to reserve to myself any variations and modifications that may appear to those skilled in the art or fall within the scope of the following claims.

Having described my invention, I claim:

1. A mechanical stage for application to the stage of a microscope and adapted to shift a slide across the upper face of the stage comprising a body having two horizontal openings extending at substantially right angles to one another and spaced one above the other, a bar shiftably passing through the lower opening in the body, means on the bar for securing the same to the stage to lie beyond an edge of the stage in spaced substantially parallel relation thereto whereby the bar supports the body at said end of the stage in spaced relation thereto and to have its upper opening in a plane above the plane of the upper surface of the stage, rack teeth on said bar, a substantially vertical shaft rotatably carried by the body and projecting downwardly therefrom, a pinion fixed to the shaft and meshing with said teeth, an operating knob secured to the projecting lower portion of the shaft manipulable to cause shifting of the body along the bar, a second bar shiftable in the upper opening and extending over the stage, teeth on said second bar, a second substantially vertical shaft rotatably carried by the body and projecting downwardly therefrom, a pinion fixed to said second shaft and meshing with the teeth on said second bar, an operating knob on the projecting lower portion of said second shaft manipulable to cause longitudinal movement of the said second bar, and a slide holder on said second bar.

2. A mechanical stage for application to the stage of a microscope and adapted to shift a slide across the upper face of the stage comprising a body having two horizontal openings extending at substantially right angles to one another and spaced one above the other, a bar shiftably passing through the lower opening in the body, means on the bar for securing the same to the stage to lie beyond an edge of the stage in spaced substantially parallel relation thereto whereby the bar supports the body at said end of the stage in spaced relation thereto and to have its upper opening in a plane above the plane of the upper surface of the stage, rack teeth on said bar, a substantially vertical shaft rotatably carried by the body and projecting downwardly therefrom, a pinion fixed to the shaft and meshing with said teeth, an operating knob secured to the projecting lower portion of the shaft manipulate to cause shifting of the body along the bar, a second bar shiftable in the upper opening and extending over the stage, teeth on said second bar, a second substantially vertical shaft rotatably carried by the body and projecting downwardly therefrom, a pinion fixed to said second shaft and meshing with the teeth on said second bar, an operating knob on the projecting lower portion of said second shaft manipulable to cause longitudinal movement of the said second bar, and a slide holder on said second bar, said knobs being below the plane of said stage and spaced one from the other.

3. A mechanical stage for application to the stage of a microscope and adapted to shift a slide across the upper face of the stage comprising a body having two horizontal openings extending at substantially right angles to one another and spaced one above the other, a bar shiftably passing through the lower opening in the body, means on the bar for securing the same to the stage to lie beyond an edge of the stage in spaced substantially parallel relation thereto whereby the bar supports the body at said end of the stage in spaced relation thereto and to have its upper opening in a plane above the plane of the upper surface of the stage, rack teeth on said bar, a substantially vertical shaft rotatably carried by the body and projecting downwardly therefrom, a pinion fixed to the shaft and meshing with said teeth, an operating knob secured to the projecting lower portion of the shaft manipulable to cause shifting of the body along the bar, a second bar shiftable in the upper opening and extending over the stage, teeth on said second bar, a second substantially vertical shaft rotatably carried by the body and projecting downwardly therefrom, a pinion fixed to said second shaft and meshing with the teeth on said second bar, an operating knob on the projecting lower portion of said second shaft manipulable to cause longitudinal movement of the said second bar, and a slide holder on said second bar, the first mentioned shaft being tubular and passing the second mentioned shaft whereby said knobs have a common axis of rotation, the knobs being below the plane of the stage.

4. A mechanical stage for application to the stage of a microscope and adapted to shift a slide across the upper face of the stage comprising a body having two horizontal openings extending at substantially right angles to one another and spaced one above the other, said openings being cylindrical, a cylindrical bar shiftably passing through the upper opening of the body, means on the bar for securing the same to the stage to lie outwardly beyond an edge of the stage in substantially parallel relation thereto whereby the bar supports the body where it is spaced outwardly beyond said edge of the stage and has its upper opening above the upper plane of the stage, a shaft rotatably supported by the body and projecting downwardly from the body, teeth cut in the bar, a pinion fixed to the shaft and meshing with said teeth, an operating knob secured to the projecting lower portion of the shaft to be below the plane of the stage and manipulable to cause shifting of the body along the bar, a second bar of cylindrical stock shiftable in the upper body opening projecting over the stage, a second shaft rotatably carried by the body and projecting from the lower end of the body, teeth cut in said second bar, a pinion fixed to said second shaft and meshing with the teeth on said second bar, an operating knob secured to the projecting lower portion of said second shaft to be below the plane of the stage and manipulable to cause longitudinal shifting of the said second bar, and a slide holder on said second bar.

5. A mechanical stage for application to the stage of a microscope and adapted to shift a slide across the upper face of the stage comprising a body having two horizontal openings extending at substantially right angles to one another and spaced one above the other, said openings being cylindrical, a cylindrical bar shiftably passing through the upper opening of the body, means on the bar for securing the same to the stage to lie outwardly beyond an edge of the stage in substantially parallel relation thereto whereby the bar supports the body where it is spaced outwardly beyond said edge of the stage and has its upper opening above the upper plane of the stage, a shaft rotatably supported by the body and projecting downwardly from the body, teeth cut in the bar, a pinion fixed to the shaft and meshing with said teeth, an operating knob secured to the projecting lower portion of the shaft to be below the plane of the stage and manipulable to cause shifting of the body along the bar, a second bar of cylindrical stock shiftable in the upper body opening projecting over the stage, a second shaft rotatably carried by the body and projecting from the lower end of the body, teeth cut in said second bar, a pinion fixed to said second shaft and meshing with the teeth on said second bar, an operating knob secured to the projecting lower portion of said second shaft to be below the plane of the stage and manipulable to cause longitudinal shifting of the said second bar, the body being adapted for limited pivotal movement on the first named bar, a slide holder on the said second bar adapted to lie against the face of the stage, and spring means urging the body to pivot on said first named bar to urge the holder against the stage.

6. A mechanical stage for application to the stage of a microscope and adapted to shift a slide across the upper face of the stage comprising a body having two horizontal openings extending at substantially right angles to one another and spaced one above the other, a bar shiftably passing through the lower opening in the body, means on the bar for securing the same to the stage to lie beyond an edge of the stage in spaced substantially parallel relation thereto whereby the bar supports the body at said end of the stage in spaced relation thereto and to have its upper opening in a plane above the plane of the upper surface of the stage, rack teeth on said bar, a substantially vertical shaft rotatably carried by the body and projecting downwardly therefrom, a pinion fixed to the shaft and meshing with said teeth, an operating knob secured to the projecting lower portion of the shaft manipulable to cause shifting of the body along the bar, a second bar shiftable in the upper opening and extending over the stage, teeth on said second bar, a second substantially vertical shaft rotatably carried by the body and projecting downwardly therefrom, a pinion fixed to said second shaft and meshing with the teeth on said second bar, an operating knob on the projecting lower portion of said second shaft manipulable to cause longitudinal movement of the said second bar, a slide holder on the said second bar movable across the stage, and clock type dials turnable with said shafts and presenting upwardly facing calibrated faces.

GEORGE LORY.